United States Patent
Kamimura et al.

(10) Patent No.: US 9,479,245 B2
(45) Date of Patent: Oct. 25, 2016

(54) RELAY APPARATUS AND COMPUTER-READABLE RECORDING MEDIUM

(71) Applicant: SoftBank BB Corp., Tokyo (JP)

(72) Inventors: Masayuki Kamimura, Tokyo (JP); Yosuke Mitsuya, Tokyo (JP); Tadashi Suzuki, Miyagi (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 14/622,923

(22) Filed: Feb. 16, 2015

(65) Prior Publication Data

US 2015/0162973 A1    Jun. 11, 2015

Related U.S. Application Data

(63) Continuation of application No. PCT/JP2013/005054, filed on Aug. 27, 2013.

(30) Foreign Application Priority Data

Sep. 26, 2012  (JP) .................................. 2012-212153

(51) Int. Cl.
*H04B 7/14* (2006.01)
*H04B 17/02* (2006.01)
(Continued)

(52) U.S. Cl.
CPC ......... *H04B 7/15528* (2013.01); *H04W 16/26* (2013.01); *H04W 24/02* (2013.01); *H04W 88/04* (2013.01)

(58) Field of Classification Search
CPC ...................................................... H04B 7/14
USPC ......................................... 455/9, 7, 16, 12.1
See application file for complete search history.

(56) References Cited

U.S. PATENT DOCUMENTS

| 4,972,346 A * | 11/1990 | Kawano | ............. H04B 7/15535 455/21 |
| 2004/0203911 A1* | 10/2004 | Masuda | ............... H04B 7/2606 455/456.1 |

(Continued)

FOREIGN PATENT DOCUMENTS

| JP | 2006-100884 A | 4/2006 |
| JP | 2010-226668 A | 10/2010 |
| JP | 2012-010294 A | 1/2012 |

OTHER PUBLICATIONS

International Search Report for International Application No. PCT/JP2013/005054, issued by the Japanese Patent Office on Oct. 29, 2013.

(Continued)

*Primary Examiner* — Tilahun B Gesesse (57) ABSTRACT

Even if a relay apparatus such as a mobile router indicates the radio wave reception intensity as low, medium, and high levels, a user using the relay apparatus such as a mobile router cannot recognize that the communication quality is lowered because the radio wave reception intensity is too high. A relay apparatus that relays wireless communication between a communication terminal and a base station is provided, the relay apparatus comprising: a first communication quality acquiring unit that acquires first communication quality of communication with the base station; a first communication quality indicating unit that indicates the first communication quality acquired by the first communication quality acquiring unit; a reception intensity acquiring unit that acquires reception intensity of a radio wave received from the base station; and a reception intensity indicating unit that indicates that the reception intensity acquired by the reception intensity acquiring unit has exceeded a predetermined threshold.

17 Claims, 10 Drawing Sheets

(51) Int. Cl.
*H04B 7/15* (2006.01)
*H04B 7/155* (2006.01)
*H04W 16/26* (2009.01)
*H04W 24/02* (2009.01)
*H04W 88/04* (2009.01)

(56) References Cited

U.S. PATENT DOCUMENTS

| | | | | |
|---|---|---|---|---|
| 2005/0181798 A1* | 8/2005 | Monden | ............... | H04L 45/00 455/446 |
| 2008/0008165 A1* | 1/2008 | Ikeda | ............... | H04L 45/00 370/360 |
| 2010/0008285 A1* | 1/2010 | Kuroda | ............ | H04W 36/0055 370/315 |
| 2010/0067533 A1* | 3/2010 | Yoshida | ............. | H04L 43/0847 370/401 |
| 2010/0232343 A1* | 9/2010 | Xu | ............ | H04B 7/155 370/315 |
| 2010/0330902 A1* | 12/2010 | Fujita | ............. | H04B 7/15557 455/7 |
| 2012/0188890 A1 | 7/2012 | Tabata | | |
| 2012/0213148 A1* | 8/2012 | Saito | ............. | H04B 7/15542 370/315 |
| 2013/0267223 A1* | 10/2013 | Tajima | ............. | H04W 76/028 455/423 |

OTHER PUBLICATIONS

International Preliminary Report on Patentability for International Application No. PCT/JP2013/005054, issued by the International Bureau of WIPO on Apr. 9, 2015.

* cited by examiner

RELAY APPARATUS AND COMPUTER-READABLE RECORDING MEDIUM

The contents of the following Japanese patent application are incorporated herein by reference: No. 2012-212153 filed on Sep. 26, 2012.

BACKGROUND

1. Technical Field

The present invention relates to a relay apparatus and a computer-readable recording medium.

2. Related Art

A mobile router that acquires radio wave reception intensity separately as low, medium, and high levels is known (for example, Patent Literature 1).

Patent Literature 1: Japanese Patent Application Publication No. 2010-226668

However, even if a relay apparatus such as a mobile router indicates the radio wave reception intensity as low, medium, and high levels, a user who uses the relay apparatus such as a mobile router cannot recognize that the communication quality is lowered because the radio wave reception intensity is too high.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
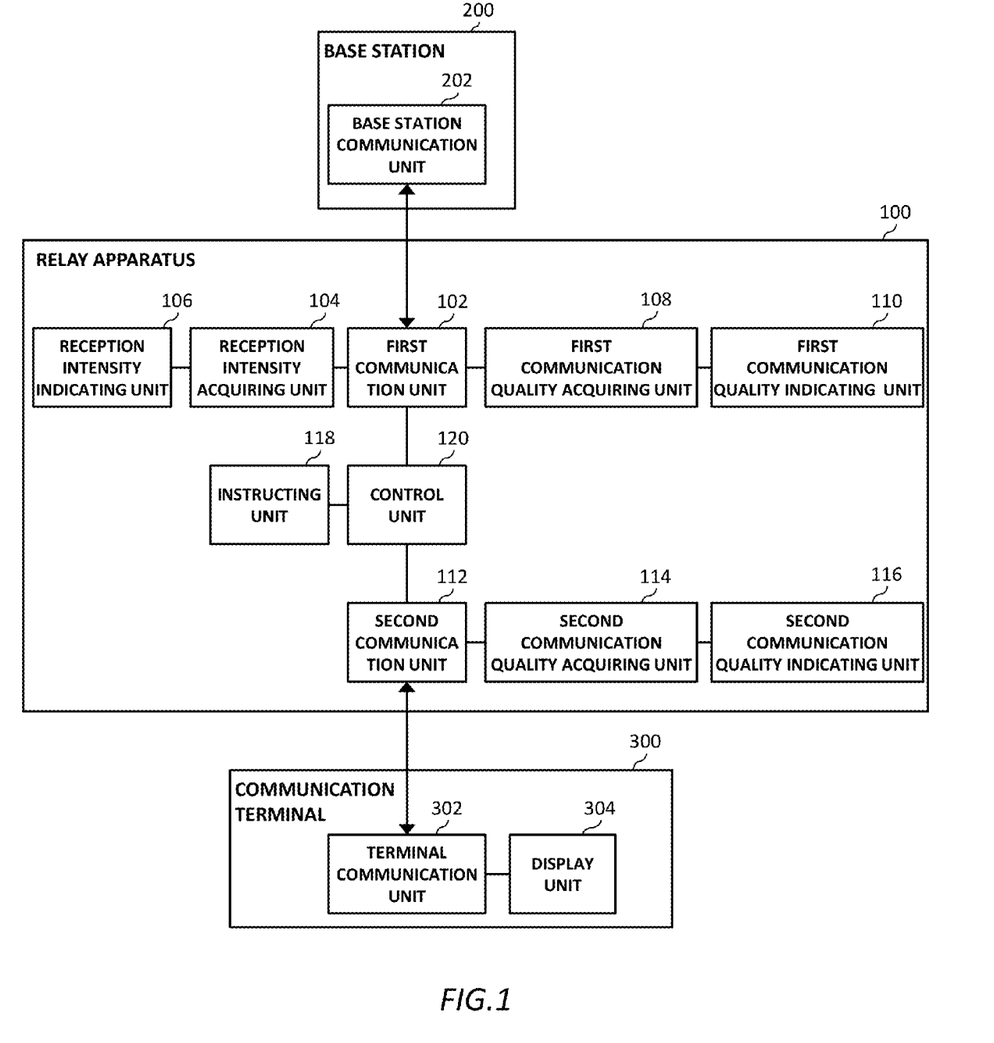
FIG. 1 schematically illustrates the functional configuration of a relay apparatus 100.

FIG. 1 schematically illustrates the functional configuration of a relay apparatus 100. The relay apparatus 100 relays wireless communication between a base station 200 and a communication terminal 300. The relay apparatus 100 comprises a first communication unit 102, a reception intensity acquiring unit 104, a reception intensity indicating unit 106, a first communication quality acquiring unit 108, a first communication quality indicating unit 110, a second communication unit 112, a second communication quality acquiring unit 114, a second communication quality indicating unit 116, an instructing unit 118, and a control unit 120.

The first communication unit 102 communicates with the base station 200 in a first wireless communication mode.

The first wireless communication mode is, for example, the LTE (Long Term Evolution). Also, the first wireless communication mode may be any of the third generation mobile communication mode (3G), the HSDPA (High Speed Downlink Packet Access), and the mobile WiMAX.

The reception intensity acquiring unit 104 acquires the reception intensity of radio waves received from the base station 200. The reception intensity acquiring unit 104, for example, measures, as the reception intensity, the RSRP (Reference Signal Received Power) of radio waves received from the base station 200.

The reception intensity indicating unit 106 indicates that the reception intensity acquired by the reception intensity acquiring unit 104 has exceeded a predetermined threshold. The predetermined threshold may be a threshold at which the communication quality between the relay apparatus 100 and the base station 200 lowers because the radio wave intensity of radio waves received from the base station 200 is too high.

The first communication quality acquiring unit 108 acquires first communication quality of communication with the base station 200. The first communication quality acquiring unit 108 may measure, as the first communication quality, the communication throughput of communication with the base station 200. Also, the first communication quality acquiring unit 108 may calculate, as the first communication quality, the RSRQ of communication with the base station 200 (Reference Signal Received Quality). Also, the first communication quality acquiring unit 108 may calculate, as the first communication quality, the SINR (Signal to Interference and Noise Ratio) of signals received from the base station 200.

Also, the first communication quality acquiring unit 108 may acquire the first communication quality based on the RSRP, the RSRQ, and the SINR. For example, the first communication quality acquiring unit 108 may acquire, as the first communication quality, a value obtained by weighting respectively and adding together the RSRP, the RSRQ, and the SINR. Furthermore, the first communication quality acquiring unit 108 may calculate the first communication quality by taking into consideration the degree of interference of radio waves emitted from other equipment.

The first communication quality indicating unit 110 indicates the first communication quality acquired by the first communication quality acquiring unit 108. The first communication quality indicating unit 110 may indicate to which communication quality level among a plurality of communication quality levels the first communication quality acquired by the first communication quality acquiring unit 108 corresponds.

The second communication unit 112 communicates with the communication terminal 300 in a second wireless communication mode. The second wireless communication mode is, for example, Wi-Fi (registered trademark). The second wireless communication mode may be a wireless LAN other than Wi-Fi, and may be a short-range wireless communication mode such as Bluetooth (registered trademark).

The second communication quality acquiring unit 114 acquires second communication quality of communication with the communication terminal 300. The second communication quality acquiring unit 114 may measure, as the second communication quality, the signal intensity of signals received from the communication terminal 300. Also, the second communication quality acquiring unit 114 acquires influence of radio waves emitted from another relay apparatus (not illustrated) on the second communication quality. The other relay apparatus may be, for example, a wireless LAN access point. The second communication quality acquiring unit 114 may measure the signal intensity of signals received from the other relay apparatus. Also, the second communication quality acquiring unit 114 may measure the signal frequency of signals received from the other relay apparatus. The second communication quality acquiring unit 114 may acquire influence of radio waves emitted from the other relay apparatus on the second communication quality based on at least any of the measured signal intensity and signal frequency of signals received from the other relay apparatus.

Also, the second communication quality acquiring unit 114 may measure, as the second communication quality, the communication throughput between the relay apparatus 100 and the communication terminal 300. The second communication quality acquiring unit 114 may, for example, execute a ping command for the communication terminal 300, and analyze a response to the ping command, the data link speed, and the presence/absence of data retransmission in the MAC layer to measure the communication throughput between the relay apparatus 100 and the communication terminal 300.

Also, the second communication quality acquiring unit 114 may receive the second communication quality from the communication terminal 300. For example, the second communication quality acquiring unit 114 may receive, from the communication terminal 300, the second communication quality measured by the communication terminal 300 during communication with the relay apparatus 100.

The second communication quality indicating unit 116 indicates the second communication quality acquired by the second communication quality acquiring unit 114. The second communication quality acquiring unit 114 may indicate to which communication quality level among a plurality of communication quality levels the second communication quality acquired by the second communication quality acquiring unit 114 corresponds.

The instructing unit 118 instructs the reception intensity acquiring unit 104 to acquire the reception intensity of radio waves received from base station 200 Also, the instructing unit 118 instructs the first communication quality acquiring unit 108 to acquire the first communication quality of communication with the base station 200. Also, the instructing unit 118 instructs the second communication quality acquiring unit 114 to acquire the second communication quality of communication with the communication terminal 300.

The instructing unit 118 may have one operation button. The instructing unit 118 may execute the instructions of the reception intensity acquiring unit 104, the first communication quality acquiring unit 108, and the second communication quality acquiring unit 114 upon detecting pressing of the operation button.

When pressing of the operation button is detected, the instructing unit 118 may continue the instructions of the reception intensity acquiring unit 104, the first communication quality acquiring unit 108, and the second communication quality acquiring unit 114 for a certain length of time. For example, when the certain length of time is set at three minutes, the acquisition and indication of the reception intensity and communication quality are executed continuously for three minutes.

The operation button may be a toggle button. When pressing of the operation button is detected, the instructing unit 118 may continuously execute the instructions of the reception intensity acquiring unit 104, the first communication quality acquiring unit 108, and the second communication quality acquiring unit 114, and stop the instructions when pressing of the operation button is detected again. Note that the instructing unit 118 may have three operation buttons respectively for executing instructions of the reception intensity acquiring unit 104, the first communication quality acquiring unit 108, and the second communication quality acquiring unit 114.

The control unit 120 controls the first communication unit 102, the reception intensity acquiring unit 104, the reception intensity indicating unit 106, the first communication quality acquiring unit 108, the first communication quality indicating unit 110, the second communication unit 112, the second communication quality acquiring unit 114, the second communication quality indicating unit 116, and the instructing unit 118.

The relay apparatus 100 may have a plurality of light-emitting units. For example, the relay apparatus 100 may have an LED indicator for indicating the first communication quality. The first communication quality indicating unit 110 may indicate the first communication quality by the LED indicator. Also, the relay apparatus 100 may have an LED indicator for indicating the second communication quality. The second communication quality indicating unit 116 may indicate the second communication quality by the LED indicator. Also, the relay apparatus 100 may have an LED for indicating that the reception intensity acquired by the reception intensity acquiring unit 104 has exceeded a predetermined threshold. The reception intensity indicating unit 106 may cause the LED to emit light to indicate that the reception intensity has exceeded a predetermined threshold.

Also, the relay apparatus 100 may have a display unit. The first communication quality indicating unit 110 may display the first communication quality on the display unit. The first communication quality indicating unit 110 may display the first communication quality as an indicator on the display unit. Also, the first communication quality indicating unit 110 may display the first communication quality as numerical data on the display unit.

The second communication quality indicating unit 116 may display the second communication quality on the display unit. The second communication quality indicating unit 116 may display the second communication quality as an indicator on the display unit. Also, the second communication quality indicating unit 116 may display the second communication quality as numerical data on the display unit.

Also, the reception intensity indicating unit 106 may display on the display unit that the reception intensity acquired by the reception intensity acquiring unit 104 has exceeded a predetermined threshold. The reception intensity indicating unit 106 may display, as text data on the display unit, that the reception intensity has exceeded a predetermined threshold. Also, the reception intensity indicating unit

106 may display on the display unit an object that indicates that the reception intensity has exceeded a predetermined threshold.

The base station 200 comprises a base station communication unit 202 that communicates with the first communication unit 102 of the relay apparatus 100. The base station 200 may be an LTE base station, and may be any of 3G, HSDPA and mobile WiMAX base stations.

The communication terminal 300 comprises a terminal communication unit 302 to communicate with the second communication unit 112 of the relay apparatus 100, and a display unit 304. The communication terminal 300 is equipment capable of communicating with the relay apparatus 100, and may be, for example, a smartphone, a tablet terminal, a PC terminal, or the like.

The first communication quality indicating unit 110 may indicate the relay apparatus 100 user of the first communication quality by displaying the first communication quality on the display unit 304. Also, the second communication quality indicating unit 116 may indicate the second communication quality by displaying the second communication quality on the display unit 304. Also, the reception intensity indicating unit 106 may display, on the display unit 304, that the reception intensity acquired by the reception intensity acquiring unit 104 has exceeded a predetermined threshold.

Figure 2:
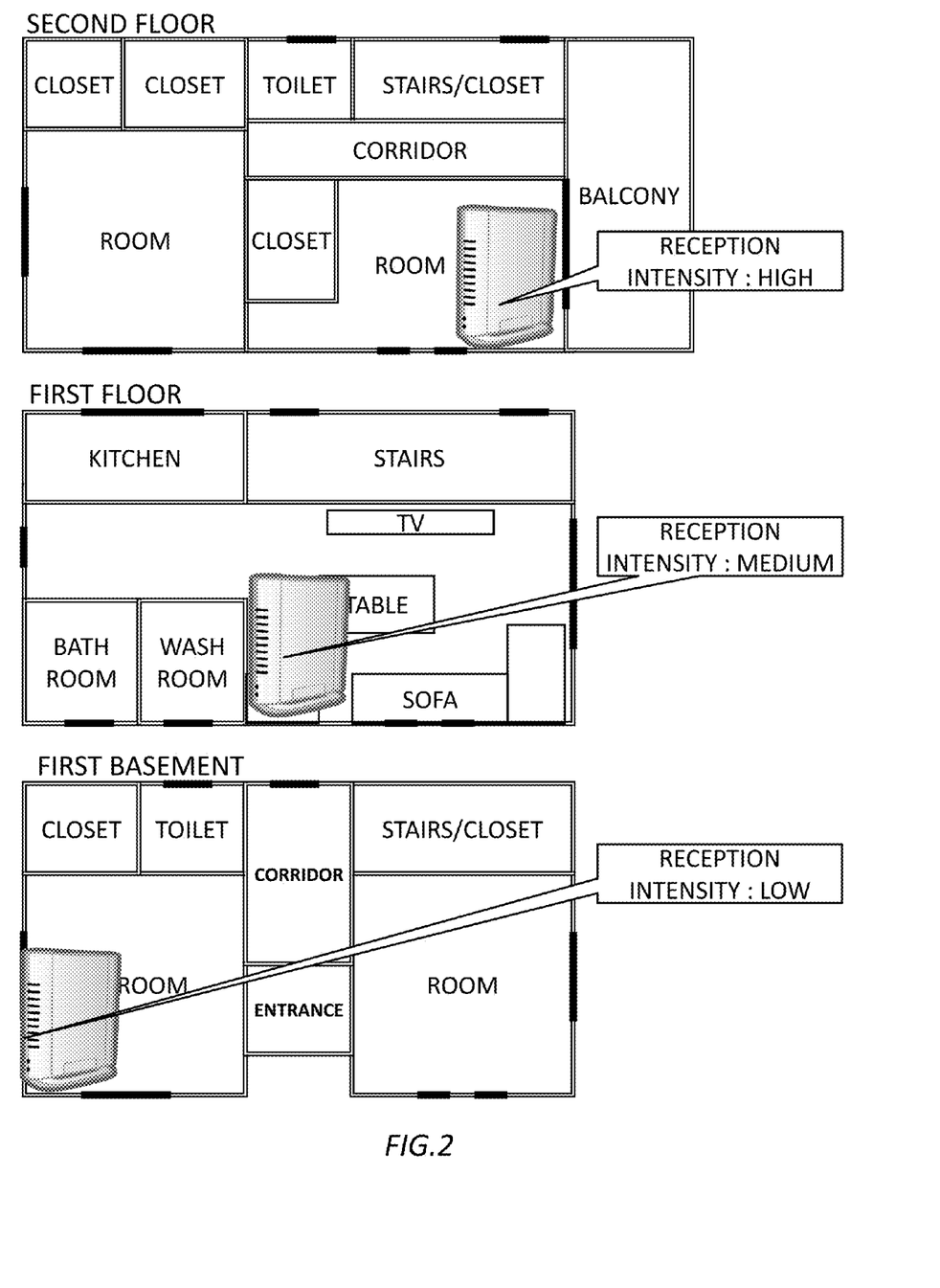
FIG. 2 schematically illustrates variation in reception intensity depending of locations where a home-installation type relay apparatus 100 is arranged.

FIG. 2 schematically illustrates variation in reception intensity depending of locations where a home-installation type relay apparatus 100 is arranged. As illustrated in FIG. 2, it has been known that the reception intensity becomes high at locations, such as a window side on a second floor, where there are few blocking objects that block radio waves, and the reception intensity becomes low at locations, such as a basement, where there are many blocking objects. Accordingly, in general, the relay apparatus 100 is in many cases arranged at locations where there are as few blocking objects as possible so as to improve the communication quality by increasing the reception intensity. However, increasing the radio wave reception intensity does not necessarily improve the communication quality.

Figure 3:
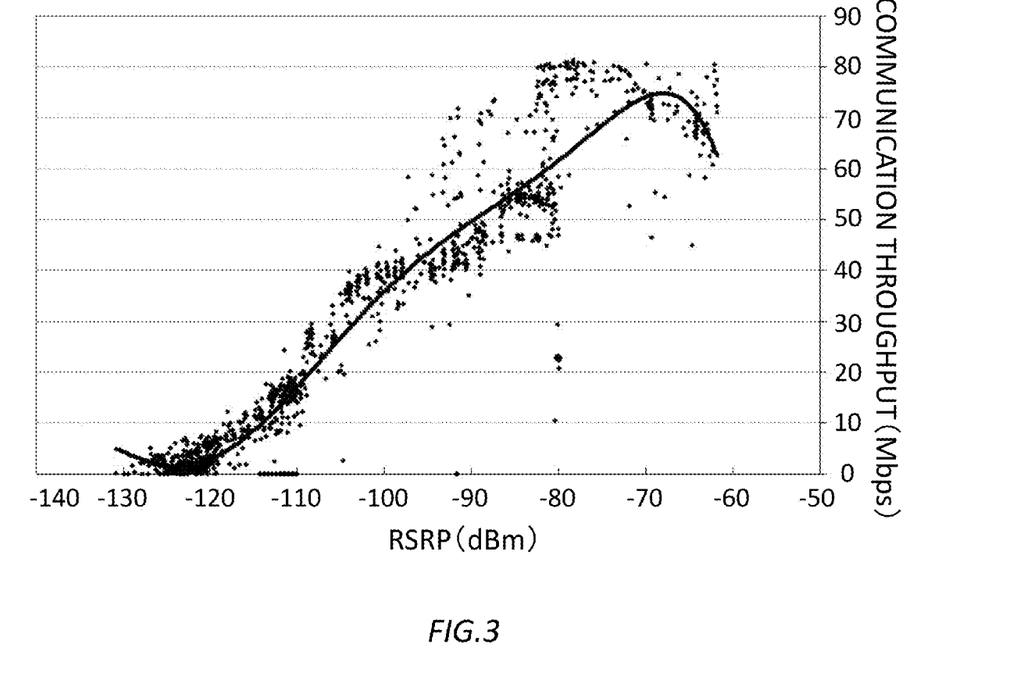
FIG. 3 illustrates experimental results obtained by actually measuring the RSRP of radio waves received by the relay apparatus 100 from a base station 200, and the communication throughput between the relay apparatus 100 and the base station 200.

FIG. 3 illustrates experimental results obtained by actually measuring the RSRP of radio waves received by the relay apparatus 100 from the base station 200, and the communication throughput between the relay apparatus 100 and the base station 200. The horizontal axis indicates the RSRP, and the vertical axis indicates the communication throughput.

As illustrated in FIG. 3, until the value of RSRP increases to around −68 dBm, higher RSRP leads to higher communication throughput. However, after the value of RSRP exceeds around −68 dBm, higher RSRP leads to lower communication throughput. In this manner, when the reception intensity of radio waves received from the base station 200 is too high to cause saturation, the communication throughput lowers.

To cope with this, the relay apparatus 100 according to the present embodiment indicates the communication quality of communication with the base station 200 and also indicates that the reception intensity of radio waves received from the base station 200 has exceeded a predetermined threshold. The predetermined threshold may be, for example, −65 dBm. Also, the predetermined threshold may be, for example, set by a user who has checked the experimental results as illustrated in FIG. 3.

Figure 4:
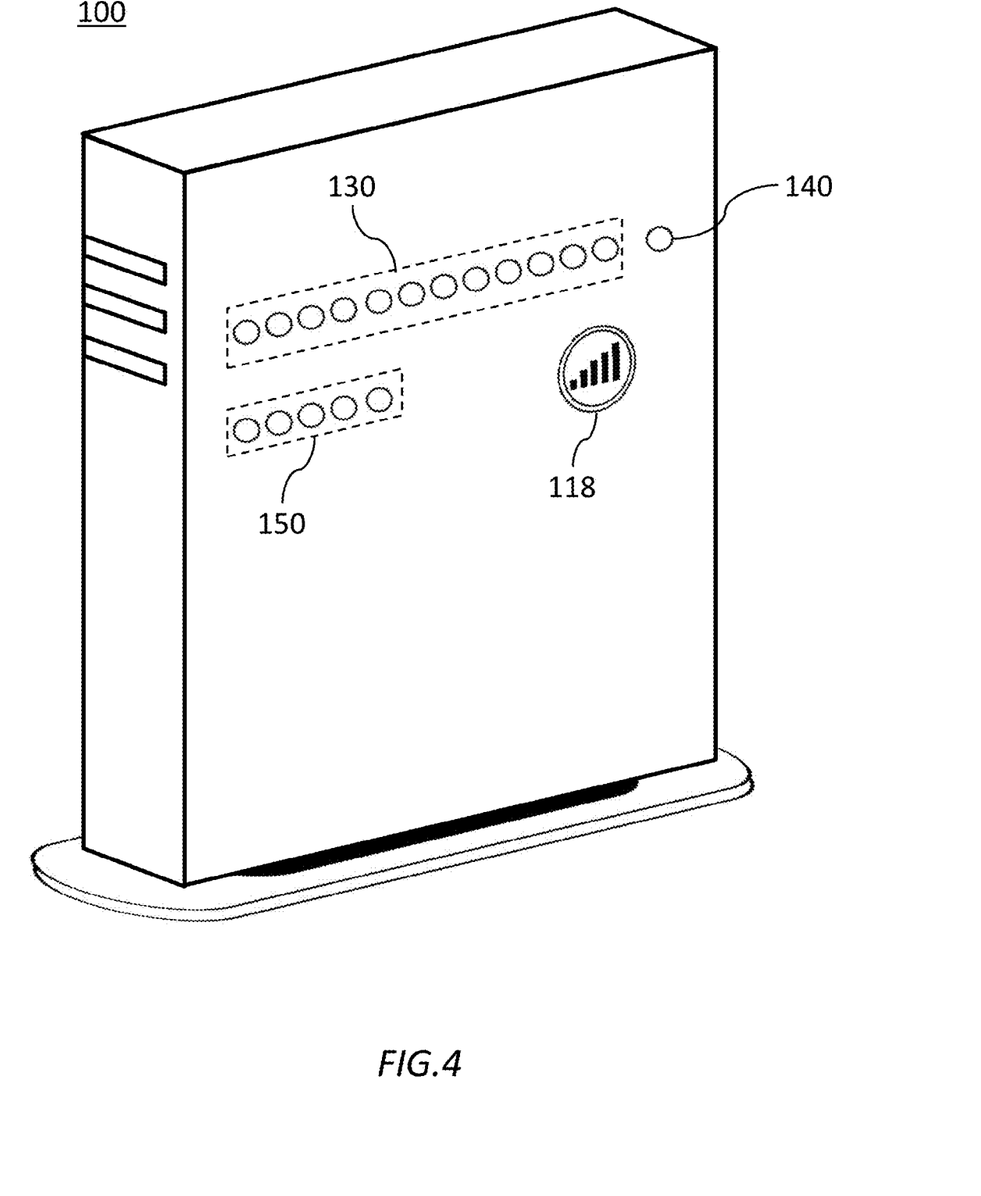
FIG. 4 schematically illustrates one example of the external appearance of the relay apparatus 100.

FIG. 4 schematically illustrates one example of the external appearance of the relay apparatus 100. The relay apparatus 100 illustrated in FIG. 4 comprises, on its side surface, the instructing unit 118 having an operation button, a plurality of first communication quality light-emitting units 130, and a reception intensity light-emitting unit 140. The plurality of first communication quality light-emitting units 130 and the reception intensity light-emitting unit 140 are LEDs for example.

The plurality of first communication quality light-emitting units 130 correspond to respective ones of a plurality of communication quality levels of communication with the base station 200. The plurality of first communication quality light-emitting units 130 may be arrayed in the order of corresponding communication quality levels. FIG. 4 illustrates an example in which the plurality of first communication quality light-emitting units 130 are arrayed such that the leftmost one, as seen when looking at the figure, corresponds to the lowest communication quality level, and the communication quality level increases as the position of a first communication quality light-emitting unit 130 shifts rightward as seen when looking at the figure.

The first communication quality indicating unit 110 may indicate the first communication quality by causing a first communication quality light-emitting unit 130, among the plurality of first communication quality light-emitting units 130, that corresponds to the first communication quality acquired by the first communication quality acquiring unit 108 to emit light. The first communication quality indicating unit 110 may cause, in addition to the first communication quality light-emitting unit 130 that corresponds to the first communication quality, first communication quality light-emitting units 130 that correspond to communication quality that is lower than the first communication quality to emit light. For example, when the first communication quality corresponds to the fourth first communication quality light-emitting unit 130 as counted from the left end, the first communication quality indicating unit 110 may cause all the four, first to fourth, first communication quality light-emitting units 130 as counted from the left end to emit light.

The plurality of first communication quality light-emitting units 130 may emit light of different colors depending on corresponding communication quality levels. For example, wavelengths of light emitted by the plurality of first communication quality light-emitting units 130 decrease according to the order of the plurality of communication quality levels. As a specific example, the leftmost first communication quality light-emitting unit 130 may emit red light, the next adjacent two first communication quality light-emitting units 130 may emit orange light, the next adjacent three first communication quality light-emitting units 130 may emit yellow, the next adjacent four first communication quality light-emitting units 130 may emit green light, and the next adjacent two first communication quality light-emitting units 130 may emit blue light.

Thereby, it is possible to allow the relay apparatus 100 user to intuitively recognize differences of the communication quality. Note that the plurality of first communication quality light-emitting units 130 may respectively have light sources, and the plurality of first communication quality light-emitting units 130 may share one light source.

The reception intensity light-emitting unit 140 may be arranged at any position on a surface of the relay apparatus 100, but is preferably arranged in the vicinity of the plurality of first communication quality light-emitting units 130 so as to be within the visual field of a user together with the plurality of first communication quality light-emitting units 130. The reception intensity light-emitting unit 140 may be arranged at a position adjacent to the first communication quality light-emitting unit 130 that corresponds to the highest communication quality level among the plurality of first communication quality light-emitting units 130. The reception intensity indicating unit 106 may indicate that the reception intensity acquired by the reception intensity acquiring unit 104 has exceeded a predetermined threshold by causing the reception intensity light-emitting unit 140 to emit light when the reception intensity has exceeded the predetermined threshold.

The relay apparatus 100 user can arrange the relay apparatus 100 at an appropriate position where the reception intensity is not too high, but the communication quality is high, by arranging the relay apparatus 100 so as not to cause the reception intensity light-emitting unit 140 to emit light, but to cause a first communication quality light-emitting unit 130 that corresponds to higher communication quality to emit light. Also, when the reception intensity light-emitting unit 140 happens to emit light, the relay apparatus 100 user can recognize that, by moving the relay apparatus 100 to a position where the reception intensity of radio waves from the base station 200 become lower, the communication quality can be improved.

Figure 5:
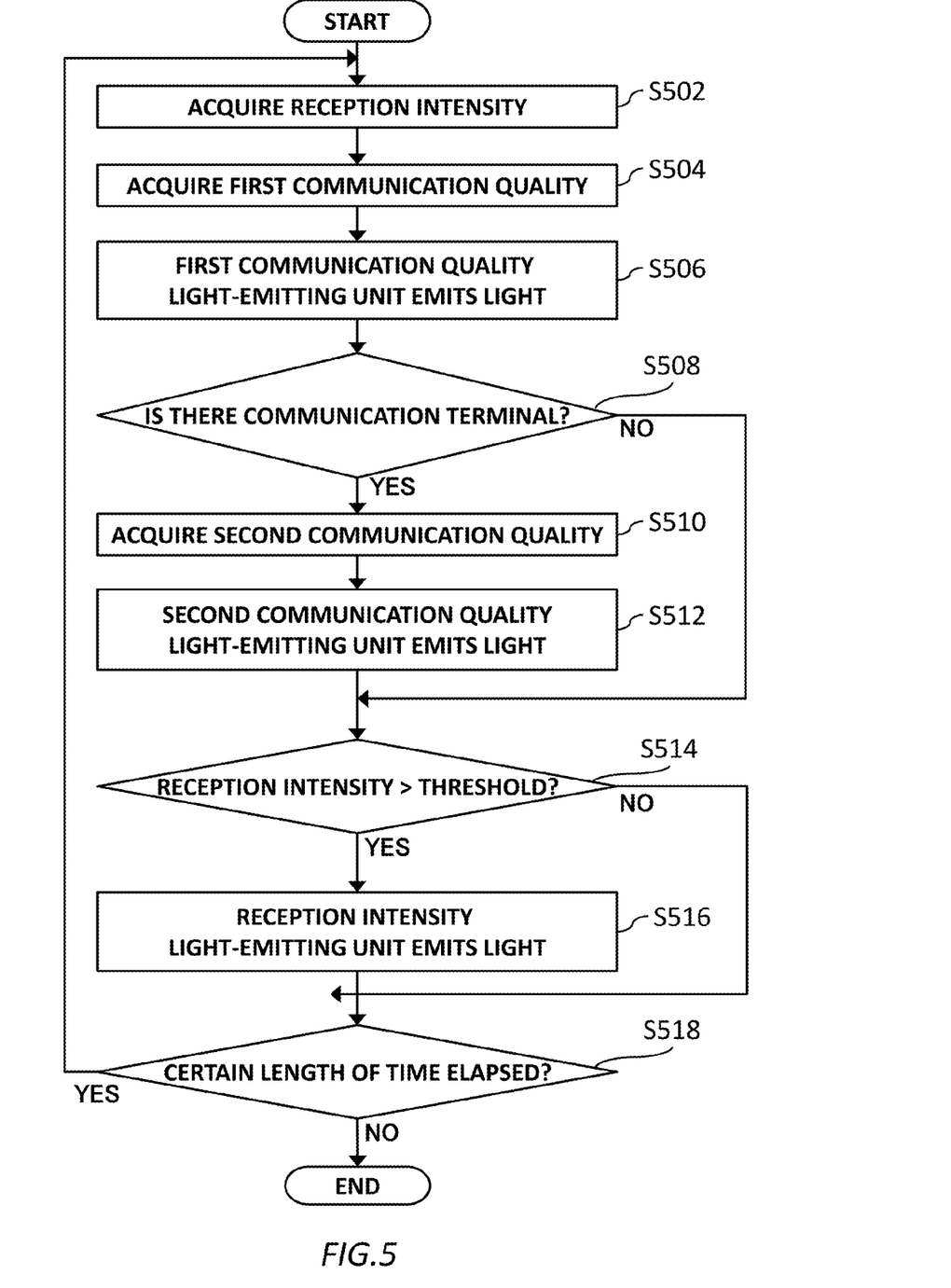
FIG. 5 illustrates one example of a flowchart of an indication process by the relay apparatus 100.

FIG. 5 illustrates one example of a flowchart of an indication process by the relay apparatus 100. The flowchart illustrated in FIG. 5 starts when an instruction from the instructing unit 118 is executed. At a step S502, the reception intensity acquiring unit 104 acquires the reception intensity of radio waves received from the base station 200.

At a step S504, the first communication quality acquiring unit 108 acquires the first communication quality of communication with the base station 200. At a step S506, the first communication quality indicating unit 110 causes the first communication quality light-emitting unit 130 to emit light to indicate the first communication quality acquired at the step S504.

At a step S508, the control unit 120 judges whether there is the communication terminal 300 that has established communication with the relay apparatus 100. If it is judged by the control unit 120 that there is the communication terminal 300 that has established communication, the process proceeds to a step S510, and if not, the process proceeds to a step S514.

At the step S510, the second communication quality acquiring unit 114 acquires the second communication quality of communication with the communication terminal 300. At a step S512, the second communication quality indicating unit 116 causes a second communication quality light-emitting unit 150 to emit light to indicate the second communication quality acquired at the step S510.

At the step S514, the control unit 120 judges whether the reception intensity acquired at the step S502 has exceeded a predetermined threshold. If it is judged by the control unit 120 that the reception intensity has exceeded the predetermined threshold, the process proceeds to a step S516, and if not, the process proceeds to a step S518. At the step S516, the reception intensity indicating unit 106 causes the reception intensity light-emitting unit 140 to emit light to indicate that the reception intensity has exceeded the predetermined threshold.

At the step S518, the control unit 120 judges whether a predetermined certain length of time has elapsed since an operation button was pressed. If it is judged by the control unit 120 that the certain length of time has not elapsed, the process returns to the step S502, and if it is judged the certain length of time has elapsed, the process ends.

As described above, the relay apparatus 100 continuously indicates the first communication quality and the second communication quality until the certain length of time elapses since the operation button is pressed. If the reception intensity of radio waves from the base station 200 exceeds the predetermined threshold when the first communication quality and the second communication quality are continuously being indicated, the reception intensity light-emitting unit 140 is caused to emit light to indicate that the reception intensity is too high.

Figure 6:
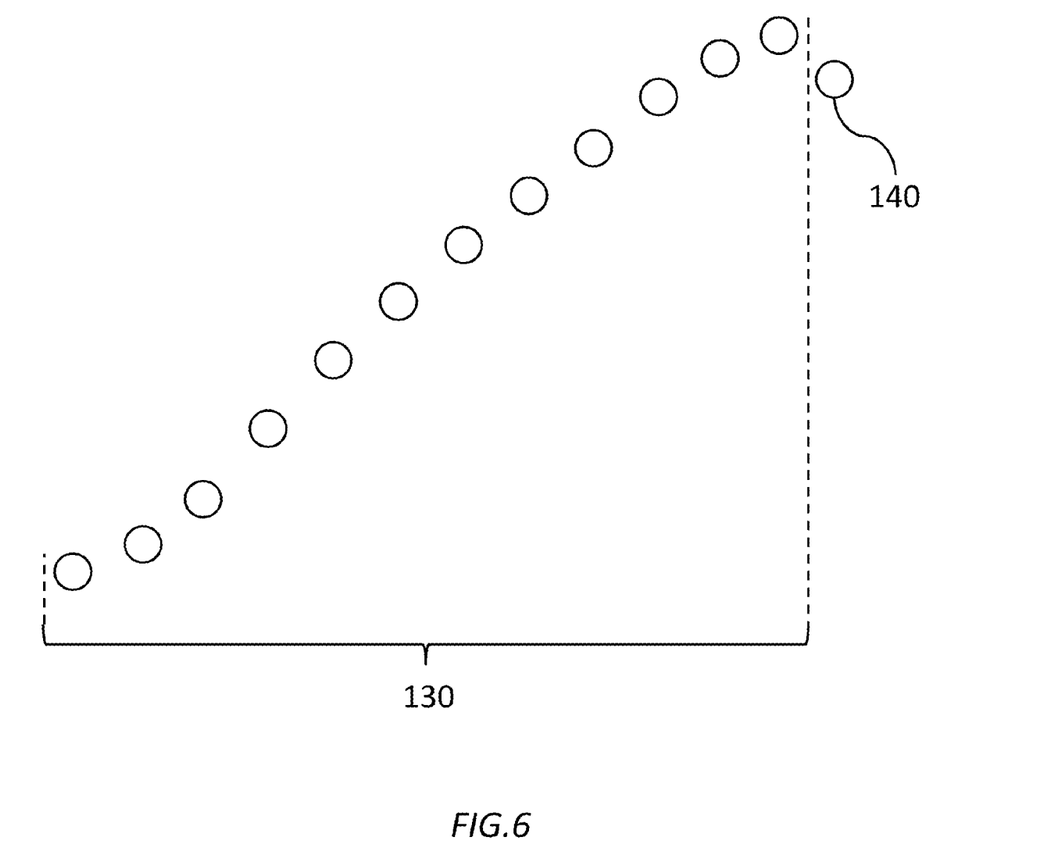
FIG. 6 schematically illustrates another array example of a plurality of first communication quality light-emitting units 130 and a reception intensity light-emitting unit 140.

FIG. 6 schematically illustrates another array example of the plurality of first communication quality light-emitting units 130 and the reception intensity light-emitting unit 140. As illustrated in FIG. 6, the plurality of first communication quality light-emitting units 130 and the reception intensity light-emitting unit 140 may be arrayed along the shape of a line graph that indicates relationship between the reception intensity of signals received from the base station 200 and the communication throughput of communication with the base station 200. The plurality of first communication quality light-emitting units 130 are arrayed such that the leftmost one, as seen when looking at the figure, corresponds to the lowest communication quality level, and the communication quality level increases as the position of a first communication quality light-emitting unit 130 shifts rightward as seen when looking at the figure.

Thereby, it is possible to cause the relay apparatus 100 user to recognize intuitively what degree of communication throughput can be expected based on the position of a first communication quality light-emitting unit 130 that is emitting light. Also, it is possible to cause the relay apparatus 100 user to recognize intuitively, when the reception intensity light-emitting unit 140 emits light, that the communication quality is lowered because the reception intensity is too high.

Figure 7:
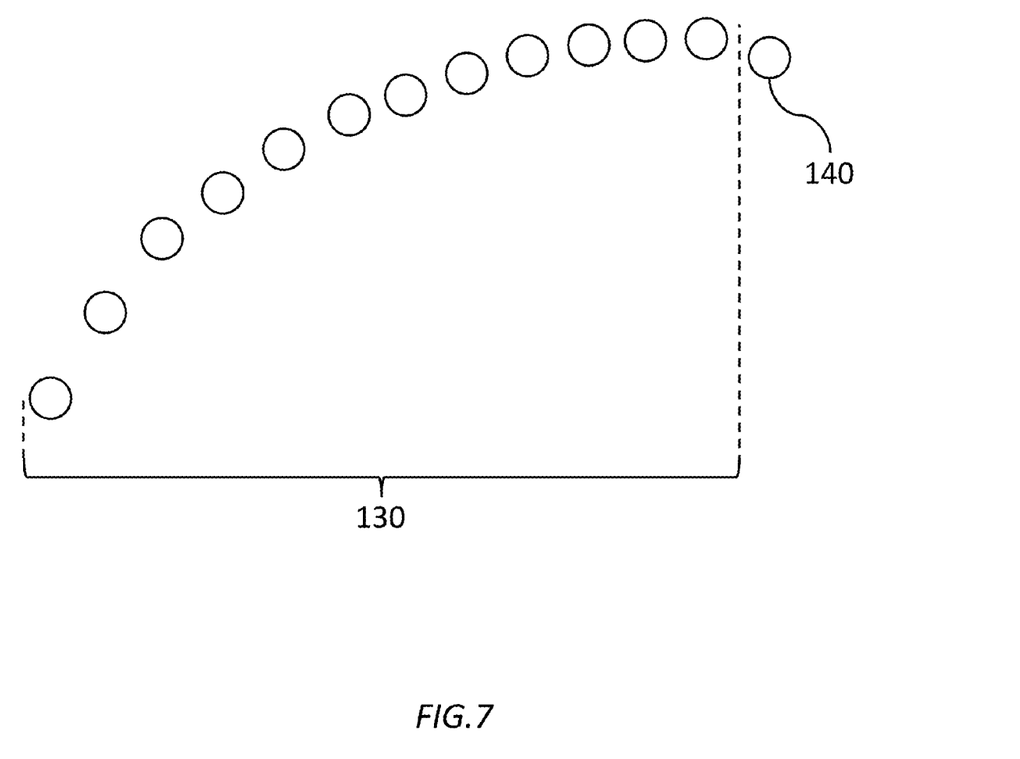
FIG. 7 schematically illustrates another array example of the plurality of first communication quality light-emitting units 130 and the reception intensity light-emitting unit 140.

FIG. 7 schematically illustrates another array example of the plurality of first communication quality light-emitting units 130 and the reception intensity light-emitting unit 140. As illustrated in FIG. 7, the position where a respective one of the plurality of first communication quality light-emitting units 130 is arranged may be higher as the position shifts rightward. Also, the reception intensity light-emitting unit 140 may be arranged on the right side of and lower than the rightmost first communication quality light-emitting unit 130 among the plurality of first communication quality light-emitting units 130.

Thereby, it is possible to cause the relay apparatus 100 user to recognize intuitively what degree of communication quality can be expected based on the position of a first communication quality light-emitting unit 130 that is emitting light. Also, it is possible to cause the relay apparatus 100 user to recognize intuitively, when the reception intensity light-emitting unit 140 emits light, that the communication quality is lowered because the reception intensity is too high.

Figure 8:
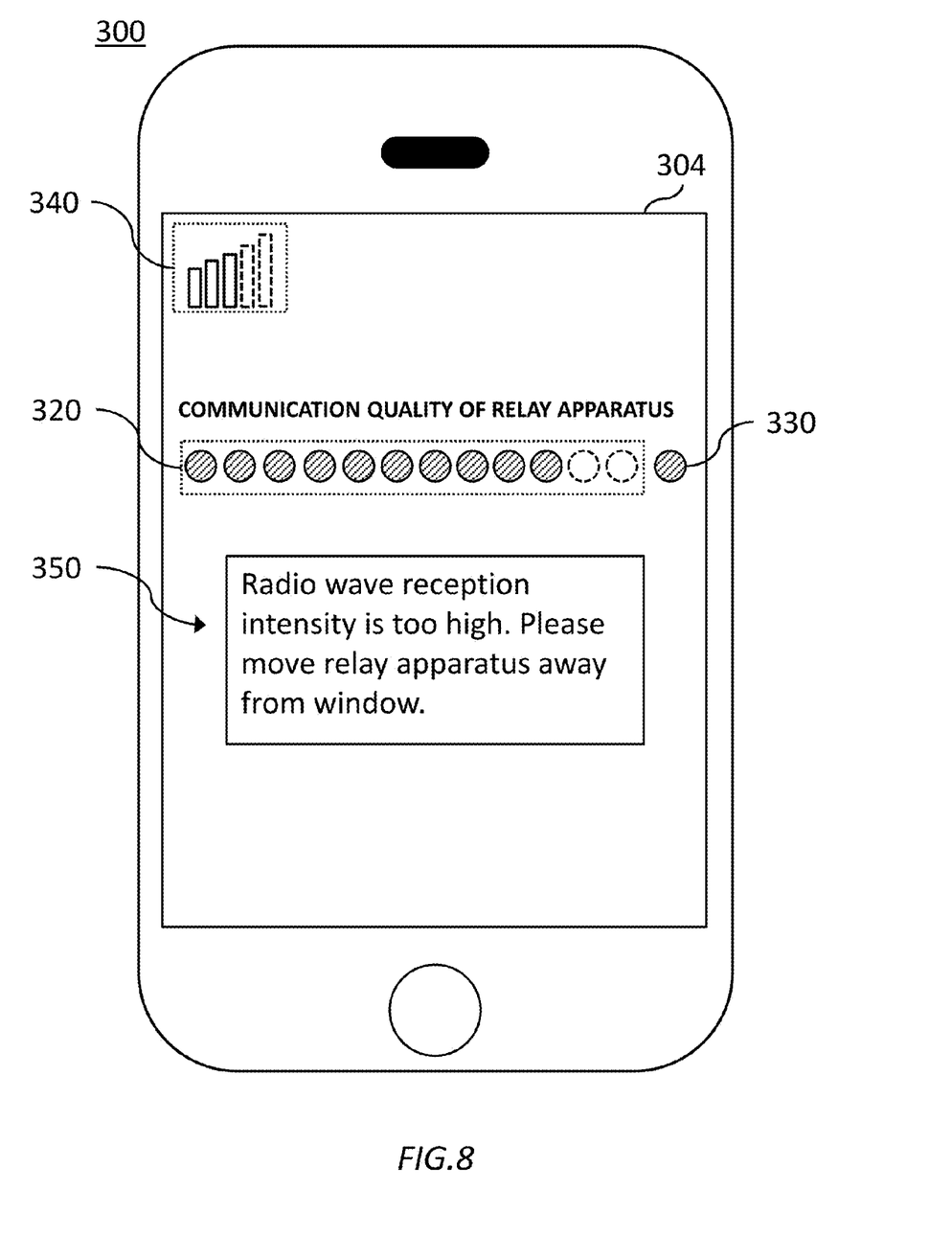
FIG. 8 schematically illustrates a display example of a display unit 304 of a communication terminal 300.

FIG. 8 schematically illustrates a display example of the display unit 304 of the communication terminal 300. On the display unit 304, a plurality of first communication quality objects 320, reception intensity information 330, a second communication quality object 340, and a comment 350 are displayed.

The first communication quality indicating unit 110 may display, on the display unit 304, a first communication quality object 320, among the plurality of first communication quality objects 320 that correspond to respective ones of a plurality of communication quality levels, that corresponds to the first communication quality between the relay apparatus 100 and the base station 200. The first communication quality indicating unit 110 may display, on the display unit 304, only the first communication quality object 320 that corresponds to the first communication quality between the relay apparatus 100 and the base station 200. Also, the first communication quality indicating unit 110 may display, on the display unit 304 in addition to the first communication quality object 320 that corresponds to the first communication quality between the relay apparatus 100 and the base station 200, first communication quality objects 320 that correspond to communication quality that is lower than the first communication quality. FIG. 8 illustrates an example in which when the first communication quality is at the level 10 among twelve levels, first communication quality objects 320 that correspond to the levels 1 to 10, respectively, are displayed on the display unit 304.

The reception intensity indicating unit 106 displays the reception intensity information 330 on the display unit 304 when the reception intensity acquired by the reception intensity acquiring unit 104 has exceeded a predetermined threshold. Also, the reception intensity indicating unit 106 may display the reception intensity information 330 on the display unit 304 when a length of time during which the reception intensity acquired by the reception intensity acquiring unit 104 has exceeded a predetermined threshold has exceeded a predetermined length of time per unit time. Thereby, it is possible to prevent the reception intensity information 330 from being displayed on the display unit 304 when the reception intensity has exceeded a predetermined threshold momentarily. The reception intensity information 330 may have a shape that is identical with the first communication quality object 320 or may have a different shape. FIG. 8 illustrates a display example in which the reception intensity information 330 and the first communication quality object 320 have identical shapes.

The reception intensity indicating unit 106 may display the comment 350 on the display unit 304 in addition to the reception intensity information 330 when the reception intensity of radio waves received by the relay apparatus 100 from the base station 200 has exceeded a predetermined threshold. The comment 350 may be a message for indicating that the reception intensity is too high. Also, the comment 350 may be a message including advice to reduce the reception intensity of the relay apparatus 100. For example, the comment 350 may be a message to recommend moving the relay apparatus away from a window.

The second communication quality indicating unit 116 displays the second communication quality between the relay apparatus 100 and the communication terminal 300 on the display unit 304. The second communication quality indicating unit 116 may display the second communication quality object 340 on the display unit 304 as the second communication quality. Also, the second communication quality indicating unit 116 may display the comment 350 about the second communication quality on the display unit 304. FIG. 8 illustrates a display example of the second communication quality object 340 when the second communication quality is at the level 3 among five levels.

Note that although an example in which the reception intensity indicating unit 106 displays the comment 350 on the display unit 304 was explained with reference to FIG. 8, the first communication quality indicating unit 110 may display the comment 350 on the display unit 304. When the first communication quality is calculated based on a plurality of values such as RSRP, RSRQ, and SINR, and the first communication quality is low, the first communication quality indicating unit 110 may display, as the comment 350 on the display unit 304, because which value among the plurality of values is low the first communication quality is lowered. For example, when the first communication quality is half of or lower than the plurality of communication quality levels, the first communication quality indicating unit 110 may display, as the comment 350 on the display unit 304, because which value among the plurality of values the first communication quality is lowered.

Figure 9:
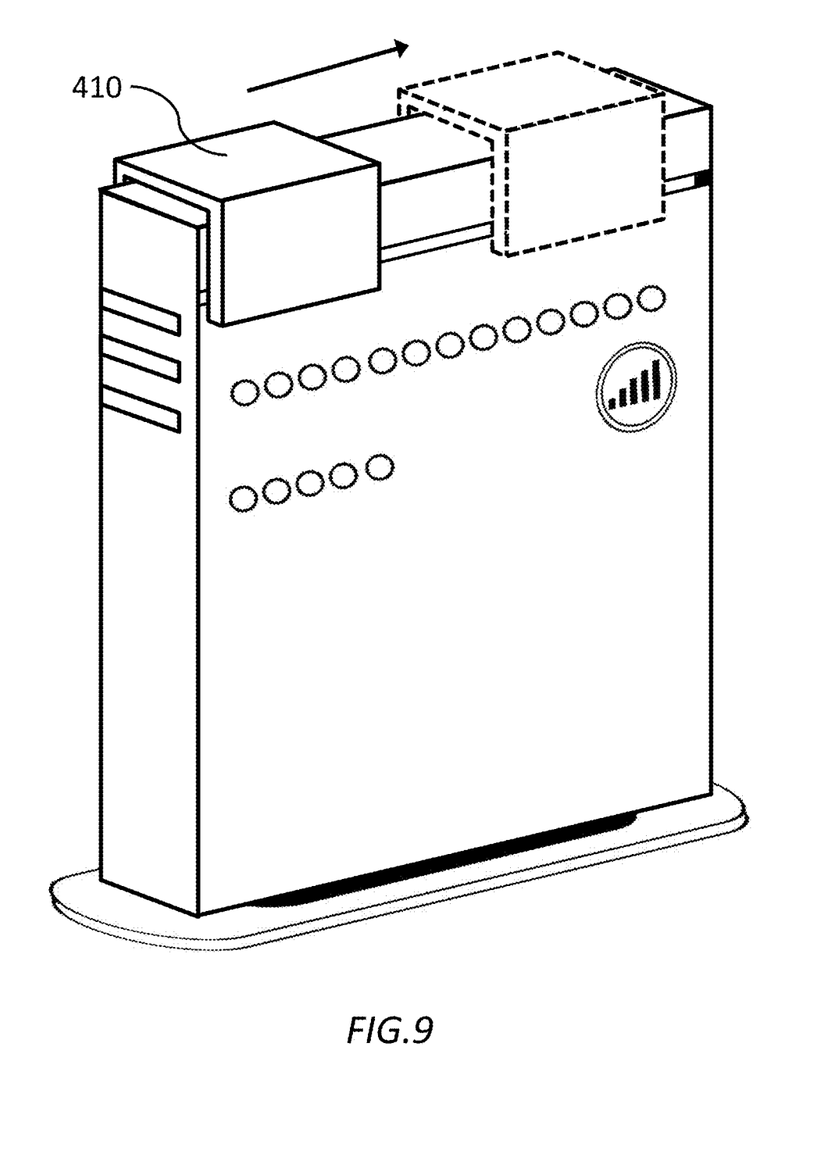
FIG. 9 schematically illustrates the relay apparatus 100 comprising a movable antenna cover 410.

FIG. 9 schematically illustrates the relay apparatus 100 comprising a movable antenna cover 410. The antenna cover 410 is made of a blocking member that blocks radio waves emitted from the base station 200. In the example illustrated in FIG. 9, the relay apparatus 100 has a built-in antenna, and depending on the position of the antenna cover 410, the degree of blocking radio waves from reaching the built-in antenna changes.

For example, when the reception intensity indicating unit 106 indicates that the reception intensity has exceeded a predetermined threshold, the relay apparatus 100 user can adjust the reception intensity by moving the antenna cover 410 instead of moving the relay apparatus 100. That is, by providing the antenna cover 410 to the relay apparatus 100, the communication quality can be improved more easily.

Figure 10:
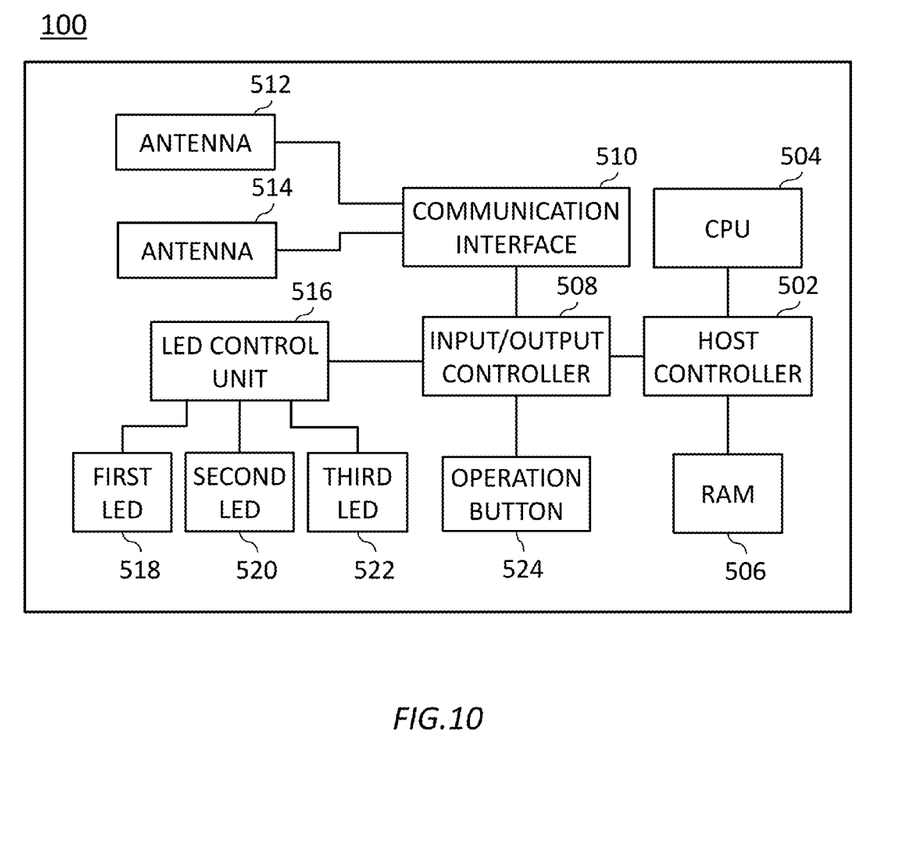
FIG. 10 illustrates one example of the hardware construction of the relay apparatus 100.

FIG. 10 illustrates one example of the hardware construction of the relay apparatus 100. The relay apparatus 100 comprises a CPU peripheral unit that has a CPU 504 and a RAM 506 that are interconnected by a host controller 502, and an input/output unit that has a communication interface 510, an LED control unit 516, and an operation button 524 that are connected to the host controller 502 by an input/output controller 508.

The host controller 502 connects the RAM 506 and the CPU 504 that accesses the RAM 506 at high transfer rate. The CPU 504 operates based on a program stored in the RAM 506, and controls each unit. The input/output controller 508 connects the host controller 502, the communication interface 510, the LED control unit 516, and the operation button 524.

The communication interface 510 communicates with the base station 200 via an antenna 512. Also, the communication interface 510 communicates with the communication terminal 300 via an antenna 514. That is, the antenna 512 may be one example of the first communication unit 102. Also, the antenna 514 may be one example of the second communication unit 112.

The LED control unit 516 controls a first LED 518, a second LED 520, and a third LED 522. The first LED 518 may be one example of the first communication quality light-emitting unit 130. The second LED 520 may be one example of the reception intensity light-emitting unit 140. The third LED 522 may be one example of the second communication quality light-emitting unit 150. The operation button 524 may be one example of an operation button provided to the instructing unit 118.

The program installed in and run by the relay apparatus 100 may act on the CPU 504 and the like to cause the relay apparatus 100 to function as the first communication unit 102, the reception intensity acquiring unit 104, the reception intensity indicating unit 106, the first communication quality acquiring unit 108, the first communication quality indicating unit 110, the second communication unit 112, the second communication quality acquiring unit 114, the second communication quality indicating unit 116, the instructing unit 118, the control unit 120, the first communication quality light-emitting unit 130, the reception intensity light-emitting unit 140, and the second communication quality light-emitting unit 150 that were explained with reference to FIGS. 1 to 9.

Note that although in the present embodiment, an example in which the relay apparatus 100 comprises the second communication quality acquiring unit 114 and the second communication quality indicating unit 116 was explained, the relay apparatus 100 may not comprise the second communication quality acquiring unit 114 and the second communication quality indicating unit 116.

Also, in the present embodiment, an example in which the reception intensity indicating unit 106 indicates that the reception intensity has exceeded a predetermined threshold by using the reception intensity light-emitting unit 140, or the display unit provided to the relay apparatus 100 or the communication terminal 300 was explained. However, the manner of indication is not limited thereto. For example, the relay apparatus 100 may indicate that the reception intensity acquired by the reception intensity acquiring unit 104 has exceeded a predetermined threshold by outputting sound such as a beep when the reception intensity has exceeded the predetermined threshold. Thereby, it is possible to allow a user to recognize that the reception intensity is too high even if the user is not gazing at the relay apparatus 100.

The relay apparatus 100 may use light-emission of the reception intensity light-emitting unit 140, display on the display unit, and sound output in combination. Also, the relay apparatus 100 may comprise any one of the reception intensity light-emitting unit 140, the display unit, and a sound output unit. By using light-emission of the reception intensity light-emitting unit 140, display on the display unit, and sound output in combination, it is possible to allow a user to surely recognize that the reception intensity is too high. Also, by providing any one of the reception intensity light-emitting unit 140, the display unit, and the sound output unit, the number of components can be reduced.

Also, the relay apparatus 100 may comprise an operation button that can emit light, instead of the reception intensity light-emitting unit 140. For example, the operation button is not caused to emit light when the reception intensity has fallen below the predetermined threshold, but that the reception intensity acquired by the reception intensity acquiring unit 104 has exceeded a predetermined threshold may be indicated by causing the operation button to emit light when the reception intensity has exceeded the threshold. Thereby, it becomes unnecessary to provide the reception intensity light-emitting unit 140, and the number of components can be reduced.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A relay apparatus that relays wireless communication between a communication terminal and a base station, the relay apparatus comprising:
   a non-transitory computer-readable recording medium having recorded therein a program, wherein the program causes a computer to perform functions including
   acquiring a first communication quality of communication with the base station, acquiring a reception intensity of a radio wave received from the base station, and acquiring a second communication quality of communication with the communication terminal;
   a first communication quality indicating unit that indicates, to a user of the relay apparatus, the acquired first communication quality;
   a reception intensity indicating unit that indicates, to the user of the relay apparatus, that the acquired reception intensity has exceeded a predetermined threshold; and
   a second communication quality indicating unit that indicates, to the user of the relay apparatus, the acquired second communication quality, wherein
   the first communication quality indicating unit indicates to which first communication quality level among a plurality of first communication quality levels the first communication quality corresponds,
   the second communication quality indicating unit indicates to which second communication quality level among a plurality of second communication quality levels the second communication quality corresponds, and
   the relay apparatus further comprises:
      a plurality of first communication quality light-emitting units that correspond to respective ones of the plurality of first communication quality levels, the plurality of first communication quality light-emitting units being arrayed in the order of corresponding first communication quality levels; and
      a plurality of second communication quality light-emitting units that correspond to respective ones of the plurality of second communication quality levels, the plurality of second communication quality light-emitting units being arrayed in the order of corresponding second communication quality levels.

2. The relay apparatus according to claim 1, wherein the first communication quality indicating unit indicates the first communication quality by causing a first communication quality light-emitting unit, among the plurality of first communication quality light-emitting units, that corresponds to the first communication quality to emit light.

3. The relay apparatus according to claim 2, wherein the plurality of first communication quality light-emitting units are arrayed along a shape of a line graph that indicates relationship between reception intensity of a signal received from the base station and communication throughput of communication with the base station.

4. The relay apparatus according to claim 2, wherein the reception intensity indicating unit indicates that the reception intensity has exceeded a predetermined threshold by causing a reception intensity light-emitting unit to emit light, and
the plurality of first communication quality light-emitting units and the reception intensity light-emitting unit are arrayed along a shape of a line graph that indicates relationship between reception intensity of a signal received from the base station and communication throughput of communication with the base station.

5. The relay apparatus according to claim 2, wherein the reception intensity indicating unit indicates that the reception intensity has exceeded a predetermined threshold by causing a reception intensity light-emitting unit to emit light, and
the reception intensity light-emitting unit is arranged at a position that is adjacent to a first communication quality light-emitting unit, among the plurality of first communication quality light-emitting units, that corresponds to a highest first communication quality level.

6. The relay apparatus according to claim 1, wherein the reception intensity indicating unit indicates that the reception intensity has exceeded a predetermined threshold by outputting sound.

7. The relay apparatus according to claim 1, wherein
the first communication quality indicating unit displays the first communication quality on a display unit, and
the reception intensity indicating unit displays on the display unit reception intensity information that indicates that the reception intensity has exceeded the predetermined threshold.

8. The relay apparatus according to claim 7, wherein
the first communication quality indicating unit displays the first communication quality on the display unit provided to the communication terminal, and
the reception intensity indicating unit displays, on the display unit provided to the communication terminal, reception intensity information that indicates that the reception intensity has exceeded the predetermined threshold.

9. The relay apparatus according to claim 7, wherein the first communication quality indicating unit displays on the display unit an object, among a plurality of objects that correspond to respective ones of a plurality of first communication quality levels, that corresponds to the first communication quality of communication with the base station.

10. The relay apparatus according to claim 7, wherein the reception intensity indicating unit displays on the display unit the reception intensity information and a message including advice to reduce reception intensity of the relay apparatus.

11. The relay apparatus according to claim 7, wherein the reception intensity indicating unit displays on the display unit the reception intensity information when a length of time during which the acquired reception intensity has exceeded a predetermined threshold has exceeded a predetermined length of time per unit time.

12. The relay apparatus according to claim 1, further comprising an antenna cover that is movable and made of a blocking member to block a radio wave emitted from the base station, the antenna cover changing in a degree of blocking a radio wave from reaching a built-in antenna depending on a position of the antenna cover.

13. The relay apparatus according to claim 1, further comprising an instructing unit that, when pressing of an operation button is detected, executes at least either of: instructing the computer to acquire reception intensity of a radio wave received from the base station; and instructing the computer to acquire the first communication quality.

14. The relay apparatus according to claim 13, wherein when pressing of the operation button is detected, the instructing unit continues instructing the computer to acquire the first communication quality for a predetermined length of time.

15. The relay apparatus according to claim 14, wherein when pressing of the operation button is detected, the first communication quality indicating unit continuously indicates the first communication quality until the predetermined length of time elapses since the operation button is pressed.

16. The relay apparatus according to claim 1, wherein
the first communication quality is acquired based on RSRP, RSRQ, and SINR of communication with the base station, and
when the first communication quality is lower than predetermined quality, the first communication quality indicating unit displays on a display unit because which value among the RSRP, the RSRQ, and the SINR is low the first communication quality is lowered.

17. A non-transitory computer-readable recording medium having recorded therein a program, wherein the program causes a computer to perform functions comprising:
acquiring a first communication quality of communication with a base station;
indicating, to a user, the acquired first communication quality;
acquiring a reception intensity of a radio wave received from the base station;
indicating, to the user, that the acquired reception intensity has exceeded a predetermined threshold;
acquiring a second communication quality of communication with a communication terminal; and
indicating, to the user, the acquired second communication quality, wherein
the indicating the acquired first communication quality includes indicating to which first communication quality level among a plurality of first communication quality levels the first communication quality corresponds,
the indicating the acquired second communication quality includes indicating to which second communication quality level among a plurality of second communication quality levels the second communication quality corresponds, and
the program further cases the computer to perform functions comprising:
causing a plurality of first communication quality light-emitting units to emit light, the plurality of first communication quality light-emitting units corresponding to respective ones of the plurality of first communication quality levels and being arrayed in the order of corresponding first communication quality levels, and
causing a plurality of second communication quality light-emitting units to emit light, the plurality of second communication quality light-emitting units corresponding to respective ones of the plurality of second communication quality levels and being arrayed in the order of corresponding second communication quality levels.

* * * * *